(12) United States Patent
Coulthard et al.

(10) Patent No.: US 6,865,495 B2
(45) Date of Patent: Mar. 8, 2005

(54) FLOW METERING

(75) Inventors: John Coulthard, Heighington (GB);
Ruixue Cheng, Stonehouse (GB); Peter Asquith, Stroud (GB)

(73) Assignee: ABB Limited, Stafford (GB)

( * ) Notice: Subject to any disclaimer, the term of this patent is extended or adjusted under 35 U.S.C. 154(b) by 2 days.

(21) Appl. No.: 10/374,711

(22) Filed: Feb. 27, 2003

(65) Prior Publication Data
US 2004/0011140 A1 Jan. 22, 2004

(30) Foreign Application Priority Data
Mar. 15, 2002 (GB) .............................................. 0206170

(51) Int. Cl.[7] .......................... G01F 1/00; G01F 17/00; G06F 15/00
(52) U.S. Cl. ........................... 702/50; 702/45; 702/189; 73/861.02; 73/861.04
(58) Field of Search ........................... 702/45, 50, 142, 702/189; 73/861, 861.02, 861.04, 861.08, 861.21

(56) References Cited

U.S. PATENT DOCUMENTS

| | | |
|---|---|---|
| 4,026,150 A | 5/1977 | Schmidt |
| 5,396,806 A | 3/1995 | Dechene et al. |
| 5,550,537 A * | 8/1996 | Perdue ................... 340/870.01 |
| 5,864,239 A | 1/1999 | Adams et al. |
| 6,305,231 B1 | 10/2001 | Coulthard et al. |

FOREIGN PATENT DOCUMENTS

| | | |
|---|---|---|
| EP | A2-0669522 | 8/1995 |
| GB | A-1303497 | 1/1973 |
| GB | A-2194058 | 2/1988 |

* cited by examiner

Primary Examiner—John Barlow
Assistant Examiner—Meagan S Walling
(74) Attorney, Agent, or Firm—Stites & Harbison PLLC; Douglas E. Jackson

(57) ABSTRACT

In order to reduce the influence of fluid velocity on a measurement of a concentration characteristic of a fluid, the magnitude of an r.m.s. signal V derived from a voltage induced in a sensor provided in relation to the fluid passage is adjusted using a factor dependent upon the measured velocity v of the fluid. Consequently, the accuracy with which the mass flow rate M of the solids in the fluid can be determined is improved.

21 Claims, 5 Drawing Sheets

FLOW METERING

This invention relates to the measurement of mass flow rates, in particular to the flow of gas-solids mixtures.

In coal fired power stations, the fuel is heated, pulverised and then injected into a furnace through a number of pneumatic conveyors each feeding an individual burner. Each conveyor is fed from a manifold or 'flow splitter' which in turn is fed from a larger diameter pipe. Accurate measurement of the 'split' of the fuel is necessary in order to ensure that each burner receives the correct quantity of fuel.

When solids are conveyed by a pneumatic conveyor, electrical charging of the particles occurs due primarily to frictional contact between particles and between particles and the conveying pipe wall. The total charge cannot be predicted since it depends upon the variable conditions of solids transportation. These include the type of material, the particle size and shape, the moisture content, the material comprising the pipe wall, the roughness of the inner surface of the pipe, the diameter of the pipe and the distance travelled by the particle. The charge polarity also depends on these conditions. Eventually, charge saturation occurs on the particles so that the value is retained for considerable distances.

In existing systems the mass flow rate of the solids is determined inferentially by separately measuring the solids velocity and the solids quantity, or concentration. The mass flow rate is obtained from these two parameters. The velocity of the particles can be readily measured by cross correlation of induced signals derived from annular electrostatic sensors fitted into the pipe wall. A signal related to the solids concentration is obtained from the root mean square value of a signal proportional to the moving charges obtained from electrodes fitted into the pipe wall. One method to obtain signals proportional to the total charge can be obtained by fitting electrically conducting rings flush with the inner wall of the conveyor. Details of the geometry of these rings are described in UK Patent 2 307 989, the contents of which are incorporated herein by reference.

Practical experience in power stations has indicated that the solids velocity may differ in the different pipes leading to the burners, influencing the value of the induced signal leading to errors in measurement of mass flow rate of the solids. Only when velocities in all conveyors were equal could an accurate measure of 'split' be made.

The present invention seeks to provide improvements in the measurement of the mass flow rate of solids. In a first aspect the present invention provides a method of measuring a concentration characteristic of a fluid flowing in a flow passage, comprising:

deriving a signal indicative of said characteristic from a voltage induced in sensor means provided in relation to the passage;

measuring the velocity of the fluid flowing in the passage;

means for deriving an additional factor, dependent on the measured velocity: and adjusting the derived signal using a said additional factor dependent upon the measured velocity to reduce the influence of fluid velocity on the measured characteristic.

The inventors have observed that the signals obtained from the electrodes fitted into the wall pipe vary with the velocity of the fluid flowing in the pipe. With reference to FIG. 5, in one study the inventors measured the variation with fluid velocity of the root mean square (r.m.s.) value of the signal obtained from electrodes fitted inside a 40 l mm diameter pipe for fluids of different known solid concentrations. From this study, it was observed that the relationship between the r.m.s. signal V and the rate of change of charge dq/dt, or velocity v, was given approximately by the equation $$V = kv^2 \tag{1}$$

where k is a coefficient constant for a given solid concentration as shown in FIG. 6.

FIG. 6 also shows that the magnitude of the signal V is directly proportional to the solids:air concentration C, the magnitude of the signal increasing with an increase in the proportion of solids in the fluid, such that $$k = k_G C \tag{2}$$

where $k_G$ is a constant related to the amplifier electrode transfer function and so $$V = k_G C v^2 \tag{3}$$

Thus, in accordance with the present invention in order to provide a characteristic measurement which is substantially independent of the effect of fluid velocity the signal V is adjusted using a factor dependent upon the measured velocity v.

Preferably, the characteristic is a concentration of solid particles in the flowing fluid. Given that the mass flow rate M can be determined from the concentration C of solid particles and fluid velocity v by the equation $$M = Cv \tag{4}$$

from equation (3) above $$M = \frac{V}{k_G v} \text{ or } V = k_G v M \tag{5}$$

Thus, the signal V generated at an electrode is proportional to the number of particles passing the electrode (mass flow rate M) and the rate of change of charge dq/dt (velocity v). Recent studies have shown that, as the velocity increases, so does the charge on the particles. To allow for this effect, a more accurate estimate of the signal V and its relation to velocity v is given by $$V = k_G M v^n \tag{5a}$$

where $n \geq 1$. For example, in vertical upwards flow the index n was found to be in the range from 1.3 to 1.5. Accordingly, in another aspect the present invention provides a method of measuring the mass flow rate of solid particles in fluid flowing in a flow passage, comprising deriving a signal V indicative of said characteristic from a voltage induced in sensor means provided in relation to the passage, measuring the velocity v of the fluid flowing in the passage, and determining the mass flow rate M from the derived signal and the measured velocity using the equation (5a) where $k_G$ is a constant and $n \geq 1$, preferably greater than 1, more preferably in the range from 1.3 to 1.5.

A further experimental study has been carried out using four 40 mm diameter vertically mounted pulverised-fuel (p.f.) meters in a vertical configuration metering pulverised coal. All measurements were taken in the "lean-phase" region where the mass ratio of solids to air is in the range from zero to just over unity, giving solids volumetric ratios of about 0.01%. The results of the study are shown in FIG. 4 for four different fluid velocities ranging from 15 m/s to 30 m/s. In agreement with the previously mentioned studies, the graphs indicate that, for a given mass flow rate M, the r.m.s. signal V increases with increasing fluid velocity v. From this study, the relationship between rms signal V, mass flow rate M and fluid velocity v was determined as $$V = k_1 v M (1 - k_2 M) \quad (6)$$

where constant $k_1$ is a function of the electronic gain conversion from electrostatic charge to electrode induced signal and is a factor in determining the initial slope of the curves, and $k_2$ is another constant introduced to account for the curvature of the characteristic which is slight but significant at higher solids concentration. This curvature may be due to the electrostatic charge not being directly proportional to concentration, or it may be due to a change in flow profile with concentration, or both. In this study, the value of $k_1$ was 0.045, and that of $k_2$ was 0.003. With the exception of the additional curvature component, equation (6) is very similar to equation (5), so when $k_2 = 0$, $$V = k_1 v M \quad (7)$$

Accordingly, in a further aspect the present invention provides a method of measuring the mass flow rate of solid particles in fluid flowing in a flow passage, comprising:

deriving a signal V indicative of said characteristic from a voltage induced in sensor means provided in relation to the passage;

measuring the velocity v of the fluid flowing in the passage; and determining the mass flow rate M from the derived signal and the measured velocity using the equation $$V = k_1 v M (1 - k_2 M)$$

where $k_1$ and $k_2$ are constants. The present invention further provides apparatus for measuring a concentration characteristic of a fluid flowing in a flow passage, comprising:

means for deriving a signal indicative of said characteristic from a voltage induced in sensor means provided in relation to the passage;

means for measuring the velocity of the fluid flowing in the passage;

means for calculating an additional factor, dependent on the fluid velocity: and means for adjusting the derived signal using said additional factor dependent upon measured velocity to reduce the influence of fluid velocity on the measured characteristic.

In a further embodiment the signal is divided by a factor proportional to the square of the measured velocity. This is consistent both with the above experimental study and with a theoretical study which has shown that to substantially eliminate the effect of fluid velocity on the characteristic measurement, the derived signal should be divided by a factor I, where $$I = k_1 v^2 e^{-k_2 v^2} \quad (8)$$

and where $k_1$ and $k_2$ are constants and v is the measured velocity.

Thus, the adjustment means may arranged to divide the derived signal by a factor I given by equation (8), where k is a constant and v is the measured velocity.

The characteristic may be a concentration of solid particles in the flowing fluid. Thus, the present invention extends to apparatus for measuring the mass flow rate of solid particles in a flowing fluid, comprising apparatus as aforementioned for measuring the concentration of solid particles in the fluid, and means for determining the mass flow rate from the concentration measurement and the measured velocity.

The present invention further extends to apparatus for measuring the mass flow rate of solid particles in a fluid flowing in a flow passage, comprising:

means for deriving a signal V indicative of the concentration of the solid particles in the fluid from a voltage induced in sensor means provided in relation to the passage;

means for measuring the velocity v of the fluid flowing in the passage; and means for determining the mass flow rate M from the equation $$M = \frac{V}{k_G v^n}$$

where $k_G$ is a constant and $n \geq 1$.

The present invention also extends to apparatus for measuring the mass flow rate of solid particles in a fluid flowing in a flow passage, comprising:

means for deriving a signal V indicative of the concentration of the solid particles in the fluid from a voltage induced in sensor means provided in relation to the passage;

means for measuring the velocity v of the fluid flowing in the passage; and means for determining the mass flow rate M from the equation $$V = k_1 v M (1 - k_2 M)$$

where $k_1$ and $k_2$ are constants.

Preferably, the sensor means comprises a pair of electrostatic electrodes.

Advantageously, the electrodes may be of different widths measured in the direction of flow. The electrodes may be annular and spaced from each other in the direction of flow.

Embodiments of the present invention will now be described, by way of example only, with reference to the accompanying drawings in which:

FIG. 1 schematically illustrates a typical flow distribution system at a power station;

Figure 1:
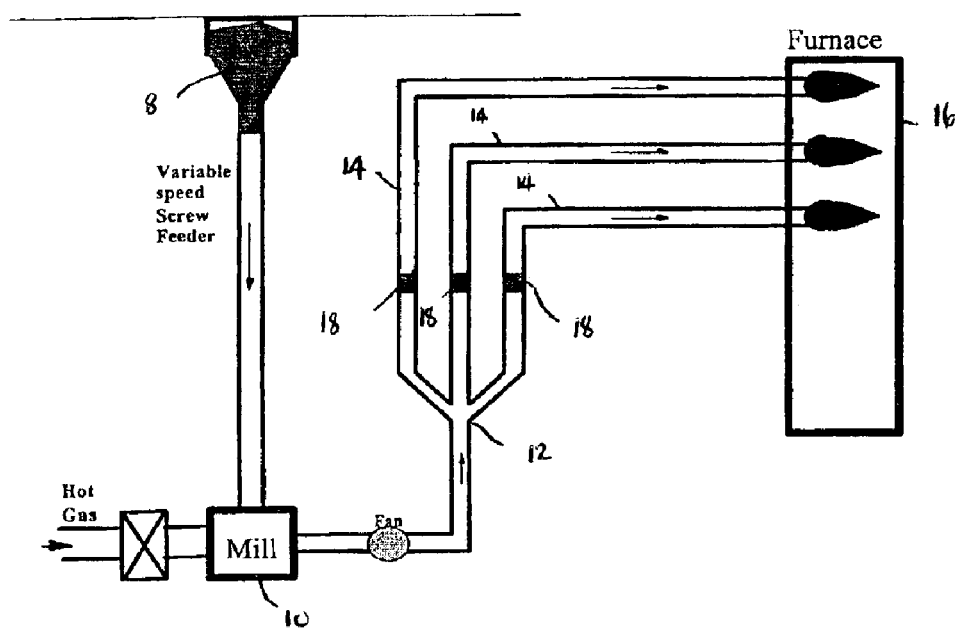

With reference first to FIG. 1, in a typical solids distribution system of a power station, solids 8 from pulverising mill 10 pass are carried in a solids-air mixture through a trifurcating junction 12 into a number (typically three as shown in FIG. 1) of pneumatic conveyors 14 leading to burners in a pulverised-fuel (pf) fired furnace 16.

Figure 2:
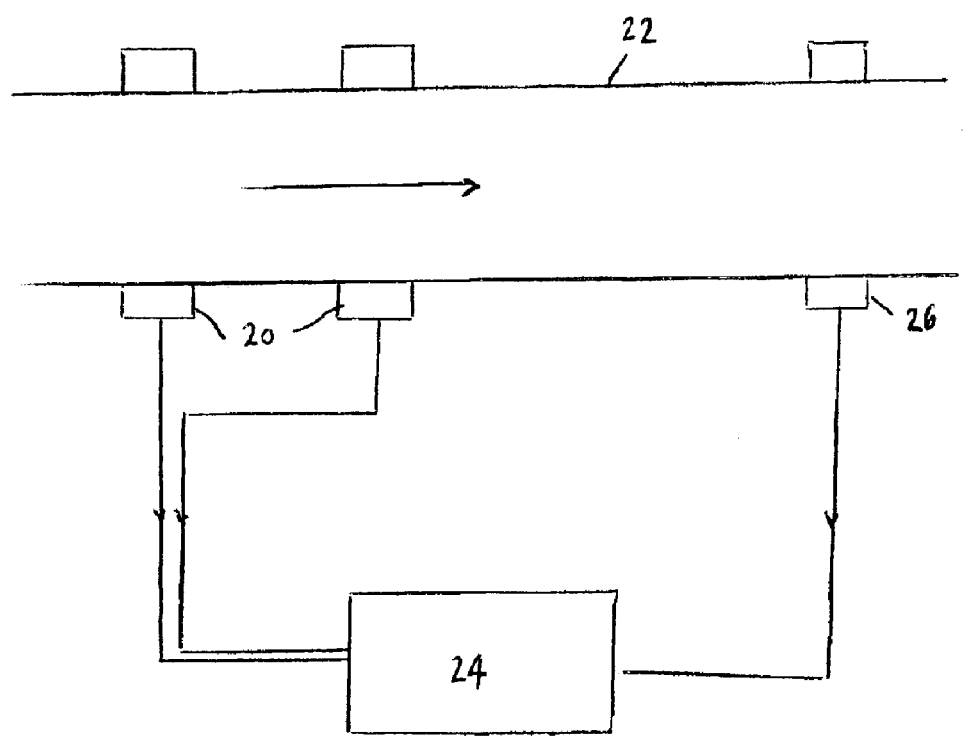
FIG. 2 illustrates a mass flow rate measurement system.

To monitor the mass flow rate of the solids through the conveyors 14, a mass flow rate measurement system 18 is provided for each conveyor 14. With reference to FIG. 2, measurement system 18 comprises two annular velocity sensors 20 placed a known distance apart in the direction of fluid flow along the passage or pipe 22 of the conveyor, which detect variations in induced charge-proportional signals. The signals are passed to a signal processor 24, typically in the form of a computer, which performs cross correlation of the signals to measure the flow transit time, from which the solids velocity v is determined.

Figure 3:
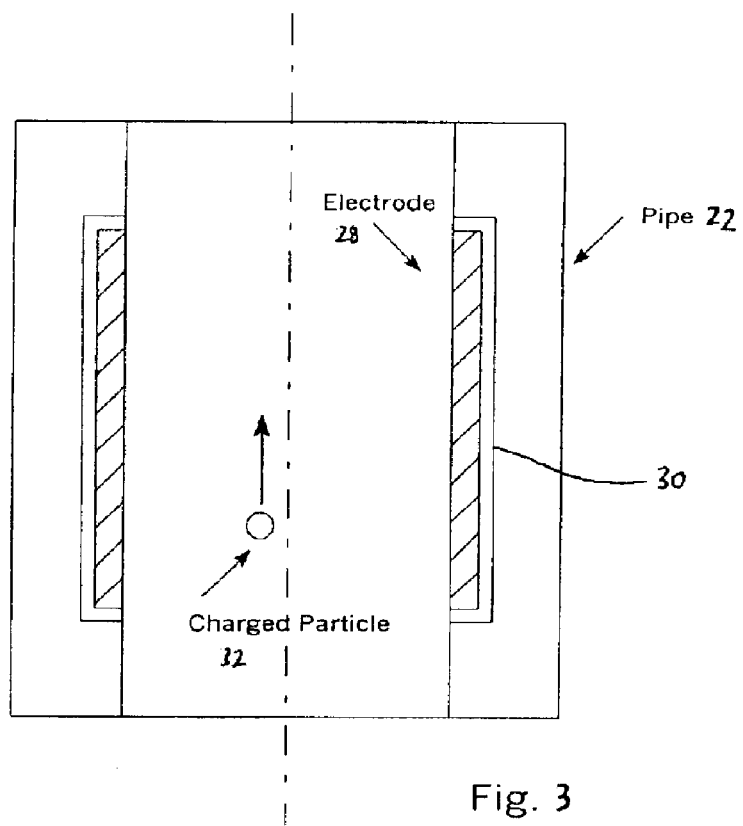
FIG. 3 illustrates a sensor arrangement for measuring solids concentration.

As shown in more detail in FIG. 3, the solids concentration C is measured using a sensor arrangement 26 comprising an annular electrostatic electrode 28 flush with the inner wall of the pipe 22 and mounted in an insulating ring 30. When a fluid containing charged particles 32 passes through the pipe 22 a voltage is generated in the electrode 28 by several mechanisms including charge transfer and induction. Further details of the sensor arrangement are described in UK Patent no 2 307 989, the contents of which are incorporated herein by reference.

Signals from the sensor arrangement 26 are also passed to the signal processor 24, from which the root mean square (rms) voltage signal V is calculated, the solids concentration C being proportional to the rms signal V. Given that the mass flow rate M can be determined from the solids concentration C and rate of change of charge dq/dt (as indicated by the fluid velocity v) by the equation $$M=Cv \quad (4)$$

the signal processor 24 can determine the mass flow rate in the pipe 22 at any given time.

Figure 4:
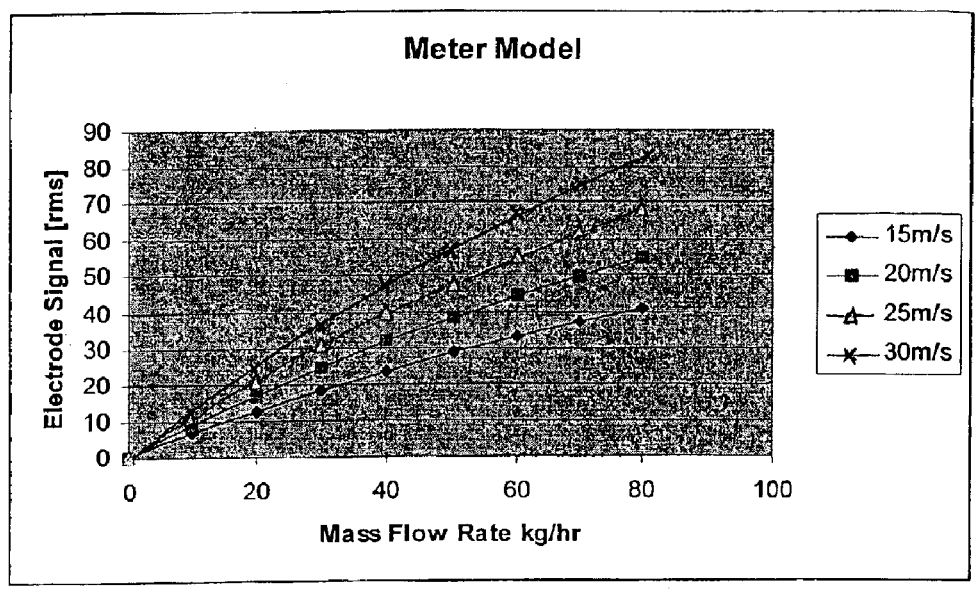
FIG. 4 is a graph showing the variation of rms signal V with mass flow rate M for a range of fluid velocities v.

The present inventors have found that there is a relationship between the magnitude of the fluid velocity v and the magnitude of the rms signal V. In one study using four 40 mm diameter vertically mounted pulverised-fuel (p.f.) meters in a vertical configuration metering pulverised coal, all rms signal V and velocity v measurements were taken in the "lean-phase" region where the mass ratio of solids to air is in the range from zero to just over unity, giving solids volumetric ratios of about 0.01%. The results of the study are shown in FIG. 4 for four different fluid velocities ranging from 15 m/s to 30 m/s. The graphs indicate that, for a given mass flow rate M, the r.m.s. signal V increases with increasing fluid velocity v. From this study, the relationship between rms signal V, mass flow rate M and fluid velocity v was determined as $$V=k_1 vM(1-k_2M) \quad (6)$$

where constant $k_1$ is a function of the electronic gain conversion from electrostatic charge to electrode induced signal and is a factor in determining the initial slope of the curves, and $k_2$ is another constant introduced to account for the curvature of the characteristic which is slight but significant at higher solids concentration. This curvature may be due to the electrostatic charge not being directly proportional to concentration, or it may be due to a change in flow profile with concentration, or both. In this study, the value of $k_1$ was 0.045, and that of $k_2$ was 0.003.

Accordingly, in one embodiment the signal processor 24 determines the mass flow rate M from the measured fluid velocity v and the rms signal V derived from the voltage generated in the sensor arrangement 26 using equation (6).

Figure 5:
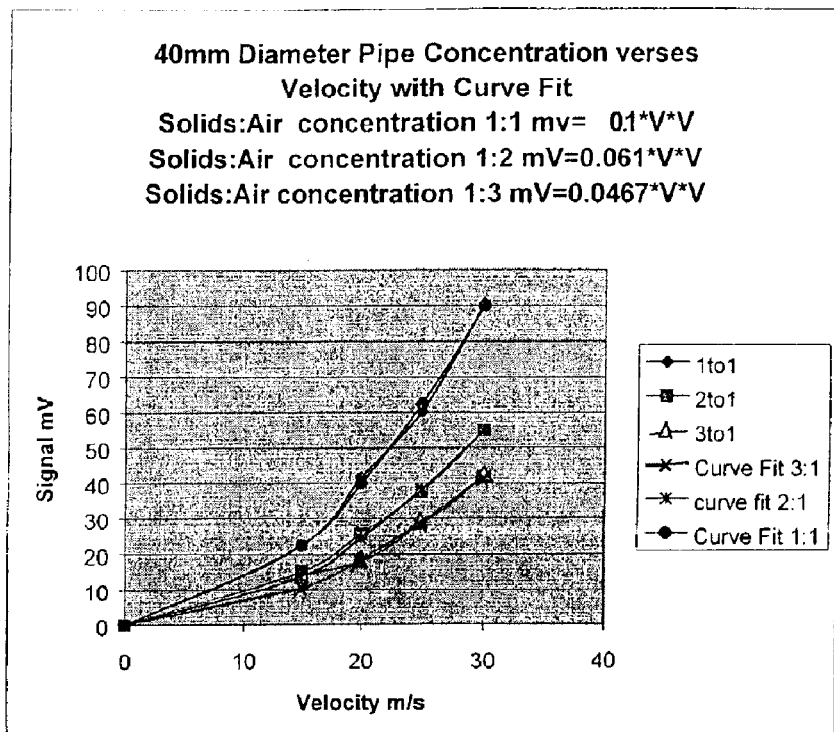
FIG. 5 is a graph showing the variation of rms signal V with fluid velocity v for a range of solids concentrations from an experimental study.
Figure 6:
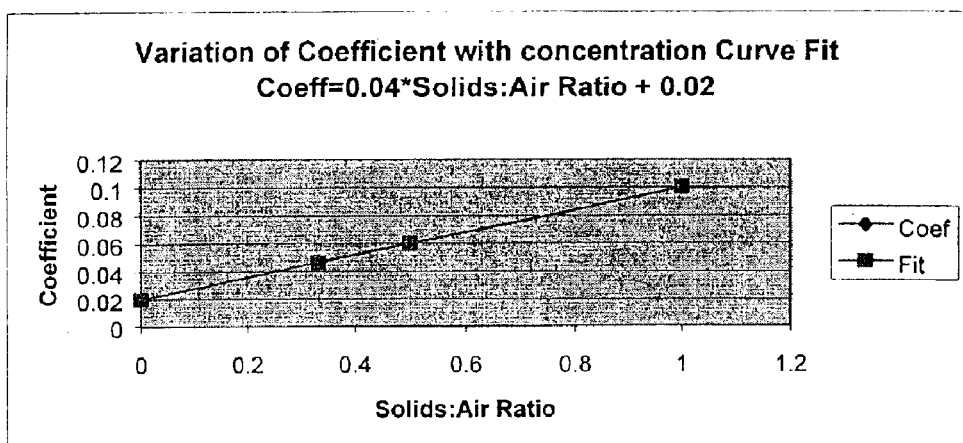
FIG. 6 is a graph showing the variation of coefficient k with solids concentration from the same experimental study.

This study was consistent with an earlier study in which, with reference to FIG. 5, the inventors observed that the relationship between the r.m.s. signal V and the fluid velocity v was given approximately by the equation $$V=kv^2 \quad (1)$$

where k is a coefficient constant for a given solid concentration C as shown in FIG. 6. As $$k=k_G C \quad (2)$$

where $k_G$ is a constant related to the amplifier electrode transfer function, $$V=k_G Cv^2 \quad (3)$$

As a result of this study, it was observed that, in order substantially to provide a solids concentration measurement which was substantially independent of the effect of fluid velocity the signal V should be divided by a factor proportional to the square of the measured velocity. This was consistent with a theoretical study which has shown that to substantially eliminate the effect of fluid velocity on the characteristic measurement, the derived signal should be divided by a factor I, where $$I=k_1 v^2 e^{-k_2 v^2} \quad (8)$$

and where $k_1$ and $k_2$ are constants and v is the measured velocity.

Accordingly, in a second embodiment the signal processor 24 determines the mass flow rate M from the measured fluid velocity v and the rms signal V derived from the voltage generated in the sensor arrangement 26 using equation (5) below:

$$V=k_G vM \quad (5)$$

Modifications will be apparent and each feature disclosed herein, particularly preferred features, may be independently provided, unless otherwise stated.

For example, although described in the context of ring electrodes around a pipe, the use of other sensor arrays and sensor geometry is contemplated. For instance, as described in UK Patent no 2 307 989 the sensor arrangement 26 may comprise two annular electrodes arranged in spaced relationship along the pipe, the electrodes having different axial extents and as a result have different spatial sensitivity characteristics to the distribution of charged particles with the fluid flow, thereby providing a signal V which is independent of the variation in the spatial distribution of charged particles across the pipe. Also, the pipe need not be circular. Other sections e.g. square or rectangular may be employed.

In addition to the relative measurement of suspended coal particles being fed to a furnace, other non limiting examples of application of the invention are the measurement of charges in particulate exhaust emissions (pollutants), relative and absolute flow measurement in pneumatic or gravimetric conveying, and in food manufacturing.

Although the discussion has been in the context of lean phase flows (e.g. less than 1% solids by volume in a carrier gas) we have found the principle is applicable in dense-phase flows (e.g. fluidised transport systems with up to 90% or more solids by volume). Capacitive sensors are preferred for dense phase applications.

More recent studies have shown that, as the velocity increases, so does the charge on the particles. To allow for this effect, a more accurate estimate of the signal V and its relation to velocity v is given by $$V=k_G Mv^n \quad (5a)$$

where $n \geq 1$. For example, in vertical upwards flow the index n was found to be in the range from 1.3 to 1.5.

In summary, in order to reduce the influence of fluid velocity on a measurement of a concentration characteristic of a fluid, the magnitude of an r.m.s. signal V derived from a voltage induced in a sensor provided in relation to the fluid passage is adjusted using a factor dependent upon the measured velocity v of the fluid. Consequently, the accuracy with which the mass flow rate M of the solids in the fluid can be determined is improved.

What is claimed is:

1. A method of measuring a concentration characteristic of a fluid flowing in a flow passage, comprising:
    deriving a signal indicative of said characteristic from a voltage induced in sensor means provided in relation to the passage;

measuring the velocity of the fluid flowing in the passage;

means for deriving an additional factor, dependent on the measured velocity; and adjusting the derived signal using said additional factor dependent upon the measured velocity to reduce the influence of fluid velocity on the measured characteristic.

2. A method according to claim 1, wherein the derived signal is divided by a factor proportional to the square of the measured velocity.

3. A method according to claim 1, wherein the derived signal is divided by a factor I, where $$I = k_1 v^2 e^{-k_2 v^2}$$

and where $k_1$ and $k_2$ are constants and v is the measured velocity.

4. A method according to claim 1, wherein the characteristic is a concentration of solid particles in the flowing fluid.

5. A method of measuring the mass flow rate of solid particles in a flowing fluid, comprising:

measuring the concentration of solid particles in the fluid according to the method of claim 4; and determining the mass flow rate from the concentration measurement and the measured velocity.

6. A method of measuring the mass flow rate of solid particles in fluid flowing in a flow passage, comprising:

deriving a signal V indicative of said characteristic from a voltage induced in sensor means provided in relation to the passage;

measuring the velocity v of the fluid flowing in the passage; and determining the mass flow rate M from the derived signal and the measured velocity using the equation $$M = \frac{V}{k_G v^n}$$

where $k_G$ is a constant and $n \geq 1$.

7. A method according to claim 6, where n is greater than 1.

8. A method according to claim 7, where n is in the range from 1.3 to 1.5.

9. A method of measuring the mass flow rate of solid particles in fluid flowing in a flow passage, comprising:

deriving a signal V indicative of said characteristic from a voltage induced in sensor means provided in relation to the passage;

measuring the velocity v of the fluid flowing in the passage; and determining the mass flow rate M from the derived signal and the measured velocity using the equation $$V = k_1 v M (1 - k_2 M)$$

where $k_1$ and $k_2$ are constants.

10. Apparatus for measuring a concentration characteristic of a fluid flowing in a flow passage, comprising:

means for deriving a signal indicative of said characteristic from a voltage induced in sensor means provided in relation to the passage;

means for measuring the velocity of the fluid flowing in the passage;

means for calculating an additional factor, dependent on the fluid velocity and;

means for adjusting the derived signal using said additional factor dependent upon the measured velocity to reduce the influence of fluid velocity on the measured characteristic.

11. Apparatus according to claim 10, wherein the adjustment means is arranged to divide the derived signal by a factor proportional to the square of the measured velocity.

12. Apparatus for measuring the mass flow rate of solid particles in a flowing fluid, comprising:

apparatus according to claim 11 for measuring the concentration of solid particles in the fluid; and means for determining the mass flow rate from the concentration measurement and the measured velocity.

13. Apparatus according to claim 10, wherein the adjustment means is arranged to divide the derived signal by a factor I, where $$I = k_1 v^2 e^{-k_2 v^2}$$

and where $k_1$ and $k_2$ are constants and v is the measured velocity.

14. Apparatus according to claim 10, wherein the characteristic is a concentration of solid particles in the flowing fluid.

15. Apparatus according to claim 10, wherein the sensor means comprises a pair of electrostatic electrodes.

16. Apparatus according to claim 15 wherein the electrodes are of different widths measured in the direction of flow.

17. Apparatus according to claim 15, wherein electrodes are annular and spaced from each other in the direction of flow.

18. Apparatus for measuring the mass flow rate of solid particles in a fluid flowing in a flow passage, comprising:

means for deriving a signal V indicative of the concentration of the solid particles in the fluid from a voltage induced in sensor means provided in relation to the passage;

means for measuring the velocity v of the fluid flowing in the passage; and means for determining the mass flow rate M from the equation $$M = \frac{V}{k_G v^n}$$

where $k_G$ is a constant and $n \geq 1$.

19. Apparatus according to claim 18, where n is greater than 1.

20. Apparatus according to claim 19, where n is in the range from 1.3 to 1.5.

21. Apparatus for measuring the mass flow rate of solid particles in a fluid flowing in a flow passage, comprising:

means for deriving a signal V indicative of the concentration of the solid particles in the fluid from a voltage induced in sensor means provided in relation to the passage;

means for measuring the velocity v of the fluid flowing in the passage; and means for determining the mass flow rate M from the equation $$V = k_1 v M (1 - k_2 M)$$

where $k_1$ and $k_2$ are constants.

* * * * *